(12) United States Patent
Shimano et al.

(10) Patent No.: US 11,290,703 B2
(45) Date of Patent: Mar. 29, 2022

(54) STEREO CAMERA, ONBOARD LIGHTING UNIT, AND STEREO CAMERA SYSTEM

(71) Applicant: Hitachi, Ltd., Tokyo (JP)

(72) Inventors: Takeshi Shimano, Tokyo (JP); Keiichi Betsui, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/257,202

(22) PCT Filed: Mar. 13, 2019

(86) PCT No.: PCT/JP2019/010265
§ 371 (c)(1),
(2) Date: Dec. 30, 2020

(87) PCT Pub. No.: WO2020/059182
PCT Pub. Date: Mar. 26, 2020

(65) Prior Publication Data
US 2021/0160476 A1 May 27, 2021

(30) Foreign Application Priority Data

Sep. 18, 2018 (JP) .............................. JP2018-173929

(51) Int. Cl.
*H04N 13/236* (2018.01)
*G06T 7/593* (2017.01)
(Continued)

(52) U.S. Cl.
CPC ......... *H04N 13/236* (2018.05); *B60Q 1/0023* (2013.01); *G06T 7/593* (2017.01);
(Continued)

(58) Field of Classification Search
USPC ....................................................... 348/48
See application file for complete search history.

(56) References Cited

U.S. PATENT DOCUMENTS

2006/0268103 A1* 11/2006 Kweon ............... H04N 13/218
348/36
2010/0201781 A1* 8/2010 Trubko ................. G02B 13/06
348/36
(Continued)

FOREIGN PATENT DOCUMENTS

JP 10-9853 A 1/1998
JP 11-95344 A 4/1999
(Continued)

OTHER PUBLICATIONS

International Search Report (PCT/ISA/210) issued in PCT Application No. PCT/JP2019/010265 dated May 14, 2019 with English translation (five (5) pages).

Japanese-language Written Opinion (PCT/ISA/237) issued in PCT Application No. PCT/JP2019/010265 dated May 14, 2019 (five (5) pages).

*Primary Examiner* — Behrooz M Senfi
(74) *Attorney, Agent, or Firm* — Crowell & Moring LLP

(57) ABSTRACT

To reduce size and cost of a stereo camera and an onboard lighting unit. A stereo camera includes a first convex hyperboloidal mirror and a second convex hyperboloidal mirror that share a central axis and are vertically disposed with vertexes facing each other, an imaging optical system, and an image sensor. The second convex hyperboloidal mirror is formed of an outer circumferential hyperboloidal mirror and an inner circumferential hyperboloidal mirror that share the central axis with different conic constants, and an absolute value of the conic constant of the inner circumferential hyperboloidal mirror is greater than an absolute value of the conic constant of the outer circumferential hyperboloidal mirror.

12 Claims, 10 Drawing Sheets

(51) Int. Cl.
  *B60Q 1/00*  (2006.01)
  *H04N 5/225*  (2006.01)
  *H04N 5/247*  (2006.01)
  *B60Q 1/04*  (2006.01)
  *B60Q 1/24*  (2006.01)
  *B60Q 1/44*  (2006.01)
  *H04N 13/00*  (2018.01)

(52) U.S. Cl.
  CPC ........... *H04N 5/2257* (2013.01); *H04N 5/247* (2013.01); *B60Q 1/04* (2013.01); *B60Q 1/24* (2013.01); *B60Q 1/44* (2013.01); *G06T 2207/10012* (2013.01); *H04N 2013/0081* (2013.01)

(56) References Cited

U.S. PATENT DOCUMENTS

2012/0242971 A1\* 9/2012 Deric ....................... G01C 3/22
  356/4.01
2014/0293055 A1\* 10/2014 Otsuka ................... G08G 1/166
  348/148

FOREIGN PATENT DOCUMENTS

| JP | 2006-33282 A | 2/2006 |
|---|---|---|
| JP | 2006-330735 A | 12/2006 |
| JP | 2010-256296 A | 11/2010 |
| JP | 2013-107476 A | 6/2013 |

\* cited by examiner

Fig.3

| HYPERBOLOIDAL MIRROR | UPPER SIDE | LOWER OUTER CIRCUMFERENTIAL SIDE | LOWER INNER CIRCUMFERENTIAL SIDE |
|---|---|---|---|
| CURVATURE RADIUS r (mm) | 15 | −17 | −22 |
| CONIC CONSTANT κ | −3.1 | −2.94 | −130 |
| VERTEX (mm) | 0 | −18.5056 | −18.5056 |
| APERTURE (mm) | 34 | 25 | 9 |

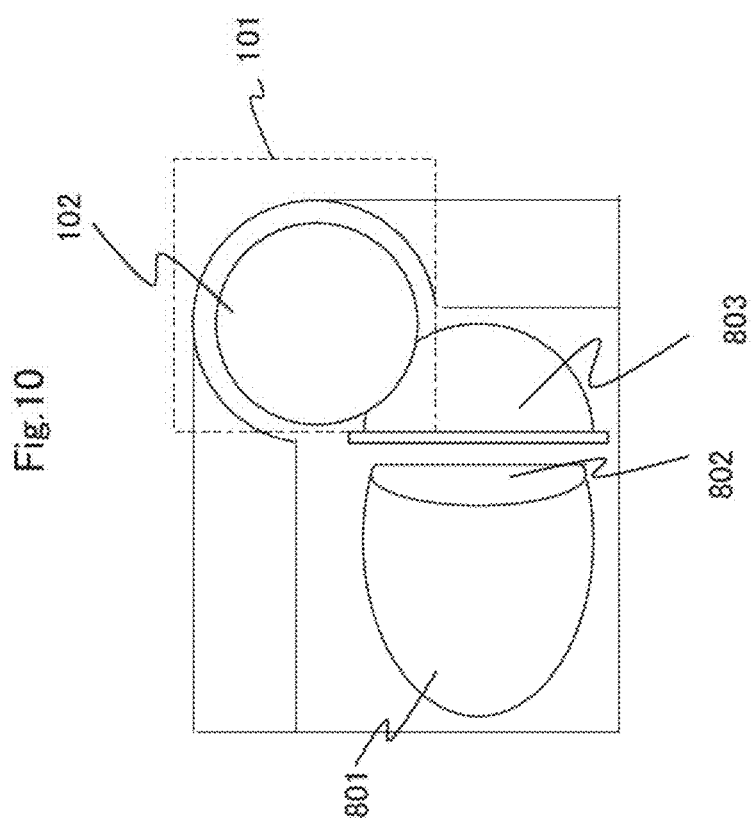

STEREO CAMERA, ONBOARD LIGHTING UNIT, AND STEREO CAMERA SYSTEM

TECHNICAL FIELD

The present invention relates to a stereo camera, an onboard lighting unit, and a stereo camera system. The present invention claims priority to Japanese Patent Application No. 2018-173929, filed on Sep. 18, 2018, the contents of which are incorporated by reference herein in its entirety in designated states where the incorporation of documents by reference is approved.

BACKGROUND ART

Development and improvement of automatic driving, automatic braking, automatic following, and the like as user support functions of a car have been advanced. A technique for detecting an object present around a car is commonly used for implementing the user support functions. Particularly, for automatic driving, it is important to establish an object detection technique of the entire circumference (circumference of 360°) of a car.

As such an object detection technique of the entire circumference of a car, a method using laser imaging detection and ranging (LIDAR) that detects the distance to an object, based on a reflection return time of a laser pulse has been known.

Further, a method using a hyperboloidal mirror has also been known, and, for example, Patent Literature 1 discloses a "three-dimensional space recognition input apparatus that extracts three-dimensional coordinate values representing a stereo image and a shape and a structure of a subject in a capturing space by using two or more capturing means for capturing an omnidirectional image by an optical system formed of mirror portions 3 and 4 and camera portions 3c and 4c".

CITATION LIST

Patent Literature

Patent Literature 1: JP 2010-256296 A

SUMMARY OF INVENTION

Technical Problem

In a case of the method using LIDAR, an image cannot be acquired only with LIDAR, and thus a camera that can obtain an image by capturing needs to be used together in order to recognize what a detected object is. Further, when a car present in the surroundings also uses LIDAR, there is a possibility that laser light beams may interfere with each other.

Since two cameras are used in the three-dimensional space recognition input apparatus described in Patent Literature 1, this causes the size of the apparatus to be large in consideration of mounting on a car. Further, the three-dimensional space recognition input apparatus needs to be disposed on four corners of a car in order to detect an object in the entire circumference of the car, and a total of eight cameras needs to be used, thereby resulting in high cost.

The present invention has been made in view of such a situation, and an object thereof is to be able to reduce size and cost of a stereo camera and an onboard lighting unit.

Solution to Problem

The present application includes a plurality of solutions to at least a part of the problems described above. One example of the solutions is as follows. In order to solve the problems described above, a stereo camera according to one aspect of the present invention includes: a first convex hyperboloidal mirror and a second convex hyperboloidal mirror configured to share a central axis and are vertically disposed with vertexes facing each other; an imaging optical system disposed in an opening provided in a vertex portion of the first convex hyperboloidal mirror; and an image sensor configured to generate an output image in which two images are simultaneously presented, the two images corresponding to two cases in which a subject is captured from two different points of view, based on light acquired from light of the subject reflected by the first convex hyperboloidal mirror, thereafter further reflected by the second convex hyperboloidal mirror, and then entering the image sensor via the imaging optical system, and light acquired from light of the subject reflected by the second convex hyperboloidal mirror and entering the image sensor via the imaging optical system, wherein the second convex hyperboloidal mirror is formed of an outer circumferential hyperboloidal mirror and an inner circumferential hyperboloidal mirror that share the central axis with different conic constants, and an absolute value of the conic constant of the inner circumferential hyperboloidal mirror is greater than an absolute value of the conic constant of the outer circumferential hyperboloidal mirror.

Advantageous Effects of Invention

The present invention can reduce size and cost of a stereo camera and an onboard lighting unit.

Problems, configurations, and effects other than those described above are defined clearly in the following description of the embodiments.

BRIEF DESCRIPTION OF DRAWINGS

FIG. 3 is a view illustrating one example of a parameter of each hyperboloidal mirror.

FIG. 10 is a top view illustrating a configuration example of the onboard lighting unit that is the second embodiment according to the present invention.

DESCRIPTION OF EMBODIMENTS

Now, with reference to the drawings, description is made on a plurality of embodiments according to the present invention. Note that, in all the drawings for illustrating each of the embodiments, the same members are basically denoted with the same reference symbols, and repeated description therefor is omitted. In the following embodiments, it is needless to say that the constituent elements (including element steps and the like) are not necessarily essential unless otherwise particularly specified, obviously considered as essential in principle, or the like. It is needless to say that the expressions "being formed of A", "being constituted of A", "having A", and "including A" are not intended to eliminate other elements unless otherwise explicitly specifying limitation to the particular element or the like. Similarly, in the following embodiments, when shapes of the constituent elements and the like, a positional relationship, and the like are referred to, shapes and the like that are substantially close to or similar to the shapes and the like are included unless otherwise particularly specified, clearly considered to be exceptional in principle, or the like.

Figure 1:
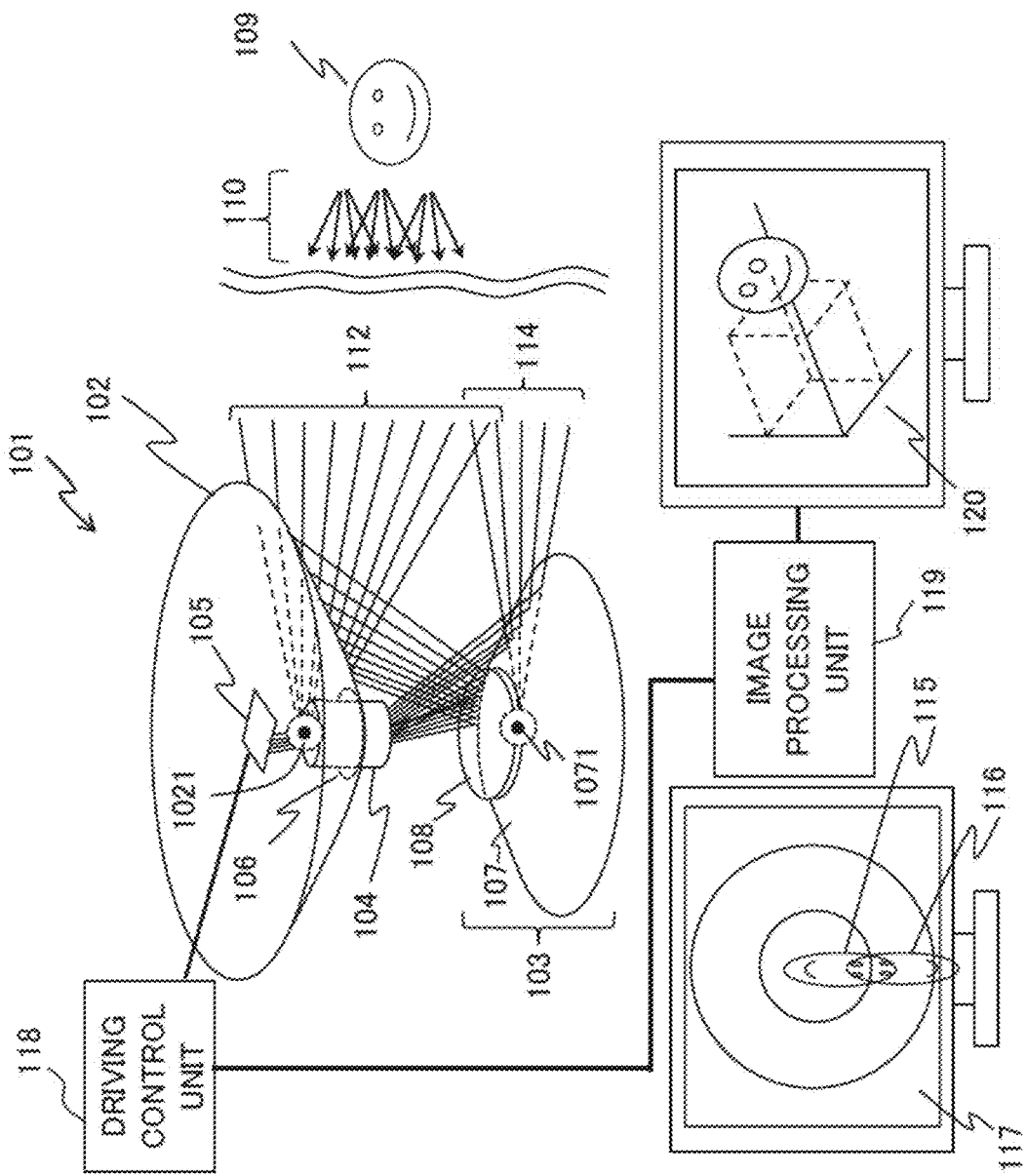
FIG. 1 is a view illustrating a configuration example of a stereo camera that is a first embodiment according to the present invention.

Configuration Example of Stereo Camera that is First Embodiment According to the Present Invention FIG. 1 illustrates a configuration example of a stereo camera 101 that is a first embodiment according to the present invention.

The stereo camera 101 includes an upper hyperboloidal mirror 102, a lower hyperboloidal mirror 103, an imaging optical system 104, an image sensor 105, a driving control unit 118, and an image processing unit 119.

The upper hyperboloidal mirror 102 and the lower hyperboloidal mirror 103 are each a mirror including a convex hyperboloid. The upper hyperboloidal mirror 102 corresponds to a first convex hyperboloidal mirror of the present invention. The lower hyperboloidal mirror 103 corresponds to a second convex hyperboloidal mirror of the present invention.

The upper hyperboloidal mirror 102 and the lower hyperboloidal mirror 103 share a central axis and are vertically disposed at a predetermined interval in a direction in which vertexes of the upper hyperboloidal mirror 102 and the lower hyperboloidal mirror 103 face each other.

The upper hyperboloidal mirror 102 has an opening 106 in a vertex portion.

The lower hyperboloidal mirror 103 is formed of an outer circumferential hyperboloidal mirror 107 and an inner circumferential hyperboloidal mirror 108 that share a central axis with different curvatures. There may be a slight step at a boundary between the outer circumferential hyperboloidal mirror 107 and the inner circumferential hyperboloidal mirror 108.

The imaging optical system 104 is formed of one or more lenses and disposed in the opening 106. The imaging optical system 104 converges light reflected by the lower hyperboloidal mirror 103, and causes the light to be incident on the image sensor 105.

The image sensor 105 is formed of, for example, a complementary metal oxide semiconductor (CMOS), generates an output image 117, based on the light entered via the imaging optical system 104 according to control from the driving control unit 118, and outputs the output image 117 to the driving control unit 118.

The driving control unit 118 controls driving of the image sensor 105. The driving control unit 118 supplies the output image 117 output from the image sensor 105, to the image processing unit 119. The image processing unit 119 generates three-dimensional positional information 120 of a subject 109, based on the supplied output image 117.

Here, a general property of the hyperboloidal mirror constituting each of the upper hyperboloidal mirror 102, the outer circumferential hyperboloidal mirror 107, and the inner circumferential hyperboloidal mirror 108 will be described.

A hyperboloid of each of the upper hyperboloidal mirror 102, the outer circumferential hyperboloidal mirror 107, and the inner circumferential hyperboloidal mirror 108 corresponds to a quadric surface represented by the following equation (1) having a conic constant κ smaller than −1.

[Math. 1]

$$z(r) = \frac{cr^2}{1 + \sqrt{1 - (1+\kappa)c^2 r^2}} \quad (1)$$

Here, $z(r)$ in the equation (1) is a sag quantity of a surface in an optical axis direction with a vertex on an optical axis as an origin. c is a curvature on the optical axis (curvature on axis). r is radial coordinates from the optical axis.

The hyperboloid generally has two focuses. Coordinates of the two focuses are represented by the following equation (2) with reference to a surface vertex.

[Math. 2]

$$f = \frac{1}{c(1 \pm \sqrt{-\kappa})} \quad (2)$$

Note that, when ± in the equation (2) is +, coordinates of the focus located inside the hyperboloid are represented. When ± in the equation (2) is −, coordinates of the focus located outside the hyperboloid are represented. Hereinafter, the focus located inside the hyperboloid is referred to as a first focus, and the focus located outside the hyperboloid is referred to as a second focus.

The hyperboloidal mirror has a property of reflecting a light beam heading toward the first focus by the hyperboloid and then condensing the reflected light to the second focus. Conversely, the hyperboloidal mirror has a property of reflecting light emitted from the second focus as if the light is emitted from the first focus.

Figure 2:
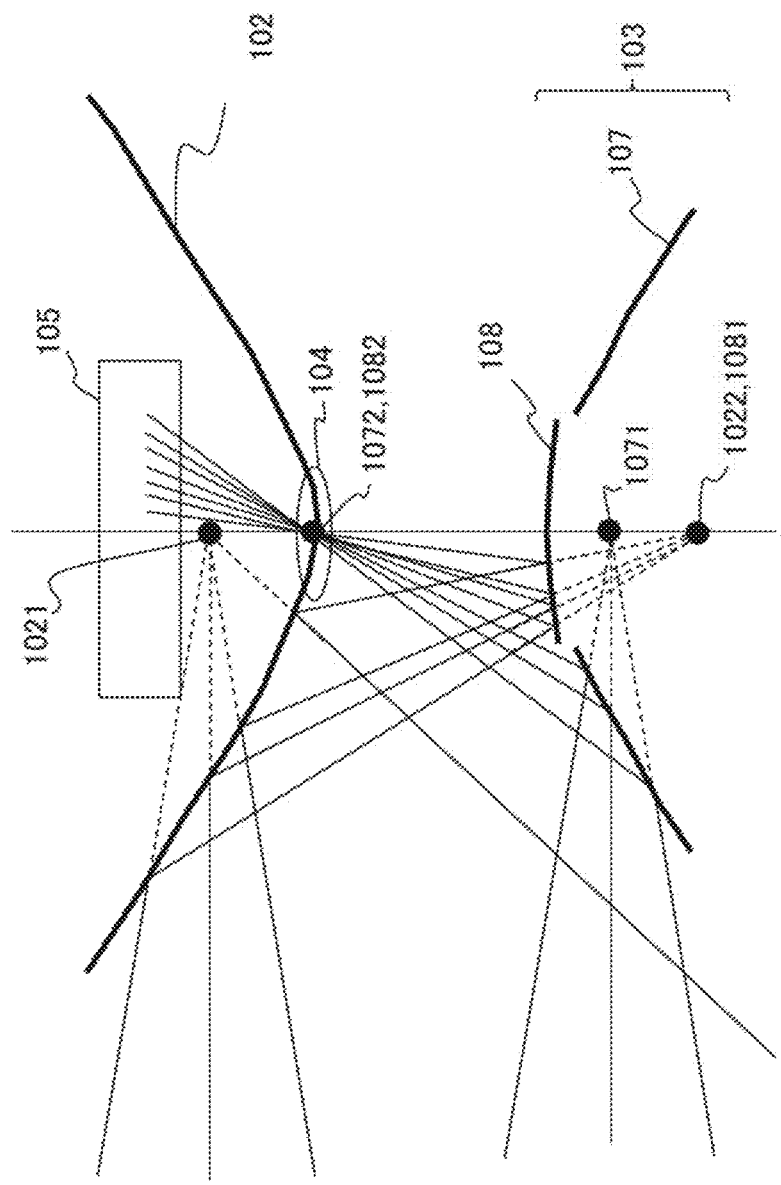
FIG. 2 is a cross-sectional view illustrating a relationship among an upper hyperboloidal mirror, an outer circumferential hyperboloidal mirror, and an inner circumferential hyperboloidal mirror.

Next, FIG. 2 is a cross-sectional view illustrating a relationship among the upper hyperboloidal mirror 102, the outer circumferential hyperboloidal mirror 107, and the inner circumferential hyperboloidal mirror 108.

The relationship among the upper hyperboloidal mirror 102, the outer circumferential hyperboloidal mirror 107, and the inner circumferential hyperboloidal mirror 108 is established such that a second focus 1022 of the upper hyperboloidal mirror 102 and a first focus 1081 of the inner circumferential hyperboloidal mirror 108 substantially coincide with each other. The coincidence point does not need to substantially coincide with a first focus 1071 of the outer circumferential hyperboloidal mirror 107, but the coincidence point is set to be located in the vicinity of the first focus 1071.

Furthermore, a second focus 1072 of the outer circumferential hyperboloidal mirror 107 and a second focus 1082 of the inner circumferential hyperboloidal mirror 108 are set to substantially coincide with each other. The imaging optical system 104 is disposed at the coincidence point. The coincidence point does not need to substantially coincide with a first focus 1021 of the upper hyperboloidal mirror 102, but the coincidence point is set to be located in the vicinity of the first focus 1021.

In this way, in the stereo camera 101 illustrated in FIG. 1, light 112 heading toward the first focus (upper point of view) 1021 of the upper hyperboloidal mirror 102 of light 110 from the subject 109 is reflected by the upper hyperboloidal mirror 102 and condensed to the second focus 1022 of the upper hyperboloidal mirror 102.

The second focus 1022 of the upper hyperboloidal mirror 102 substantially coincides with the first focus 1081 of the inner circumferential hyperboloidal mirror 108. Thus, the light condensed to the second focus 1022 of the upper hyperboloidal mirror 102 can be regarded as light heading toward the first focus 1081 of the inner circumferential hyperboloidal mirror 108, and thus the light is reflected by the inner circumferential hyperboloidal mirror 108 again and condensed to the second focus 1082 of the inner circumferential hyperboloidal mirror 108.

On the other hand, light 114 heading toward the first focus (lower point of view) 1071 of the outer circumferential hyperboloidal mirror 107 of the light 110 from the subject 109 is reflected by the outer circumferential hyperboloidal mirror 107 and condensed and reflected toward the second focus 1072 of the outer circumferential hyperboloidal mirror 107.

The second focus 1072 of the outer circumferential hyperboloidal mirror 107 and the second focus 1082 of the inner circumferential hyperboloidal mirror 108 substantially coincide with each other, and the imaging optical system 104 is disposed at the coincidence point. Therefore, reflected light reflected by the upper hyperboloidal mirror 102 and further reflected by the inner circumferential hyperboloidal mirror 108 and reflected light reflected by the outer circumferential hyperboloidal mirror 107 are simultaneously entered to the image sensor 105 by the imaging optical system 104. In this way, the image sensor 105 can generate the output image 117 in which an image 115 of the subject 109 viewed from the upper point of view (first focus) 1021 is presented on an inner circumferential side and an image 116 of the subject 109 viewed from the lower point of view (first focus) 1071 is simultaneously presented on an outer circumferential side.

The output image 117 acquired in such a manner is supplied to the image processing unit 119 via the driving control unit 118. The image processing unit 119 separates the output image 117 into an inner circumferential region in which the image 115 is presented and an outer circumferential region in which the image 116 is presented, performs projective transformation processing on each of the regions, performs disparity matching processing on two images acquired as a result of the projective transformation processing, and generates the three-dimensional positional information 120 of the subject 109.

For example, the generated three-dimensional positional information 120 may be displayed on a display, supplied to an electronic control unit (ECU) of a car on which the stereo camera 101 is mounted, output to an integration control unit 402 (FIG. 5), and/or transmitted to a predetermined server.

Note that some of constituent elements of the stereo camera 101 described above, for example, the driving control unit 118 and the image processing unit 119 may be independently provided from the stereo camera 101 and processing of the constituent elements may be executed by, for example, the ECU of a car on which the stereo camera 101 is mounted.

Other Relationship Among Upper Hyperboloidal Mirror 102, Outer Circumferential Hyperboloidal Mirror 107, and Inner Circumferential Hyperboloidal Mirror 108

In the stereo camera 101 that is the first embodiment, an absolute value of the conic constant κ of the inner circumferential hyperboloidal mirror 108 is set to a value greater than an absolute value of the conic constant κ of the outer circumferential hyperboloidal mirror 107. In this way, in the output image 117, the size of the image 115 of the subject 109 viewed from the upper point of view 1021 matches the size of the image 116 of the subject 109 viewed from the lower point of view 1071.

By matching the size of the image 115 on the inner circumferential side and the size of the image 116 on the outer circumferential side in the output image 117, resolutions of the image 115 and the image 116 can match each other, and accuracy of the disparity matching processing can be increased.

In the stereo camera 101, the upper hyperboloidal mirror 102 adopts a hyperboloidal mirror having a larger aperture than that of the lower hyperboloidal mirror 103. Using the aperture of the upper hyperboloidal mirror 102 larger than that of the lower hyperboloidal mirror 103 allows a light beam having an upward angle of view of the lower point of view 1071 to be received at the upper point of view 1021, and to secure a maximally wide vertical angle-of-view range in which stereoscopic vision is possible.

Note that, if the upper hyperboloidal mirror 102 and the lower hyperboloidal mirror 103 have a substantially equal aperture, a visual field range of the lower point of view 1071 is inevitably narrow because the lower hyperboloidal mirror 103 is separated into the outer circumferential hyperboloidal mirror 107 and the inner circumferential hyperboloidal mirror 108.

In the stereo camera 101, the upper hyperboloidal mirror 102 having a larger aperture and including the imaging optical system 104 is disposed on an upper side, and the lower hyperboloidal mirror 103 having a smaller aperture is disposed on a lower side. There is practically no hindrance when the vertical positional relationship is reversed.

However, when the stereo camera 101 is mounted on a car and disposed on each of four corners of the car, there is a problem that an angle-of-view range in which stereoscopic vision is possible is not very wide. Particularly, in order to use the stereo camera 101 for ambient sensing for complete automatic driving, it is essential to capture the vicinity of the car, and a downward angle-of-view range needs to be secured.

In the stereo camera 101, a light beam having a downward angle of view incident on the upper point of view 1021 can cover a range wider than an angle-of-view range in which the light beam is incident on the lower point of view 1071. In this way, the vicinity of the car can be captured, which is, however, with monocular vision by the upper point of view 1021. An image of the vicinity of the car is needed mainly for detecting a white line such as a center line drawn on a road surface, but a white line is known to be drawn on a road surface, and thus a distance can be measured even with the monocular vision. Thus, it is effective that the larger upper hyperboloidal mirror 102 in which the imaging optical system 104 is disposed is disposed on the upper side.

Next, FIG. 3 illustrates one example of a curvature radius r, a conic constant κ, a vertex position, and an aperture related to the upper hyperboloidal mirror 102, the outer circumferential hyperboloidal mirror 107, and the inner circumferential hyperboloidal mirror 108.

In the example in FIG. 3, the upper hyperboloidal mirror 102 has the curvature radius r of 15 mm, the conic constant κ of −3.1, the vertex position of 0 mm, and the aperture of 34 mm, the outer circumferential hyperboloidal mirror 107 has the curvature radius r of −17 mm, the conic constant κ of −2.94, the vertex position of −18.5056 mm, and the aperture of 25 mm, and the inner circumferential hyperboloidal mirror 108 has the curvature radius r of −22 mm, the conic constant κ of −130, the vertex position of −18.5056 mm, and the aperture of 9 mm.

Figure 4:
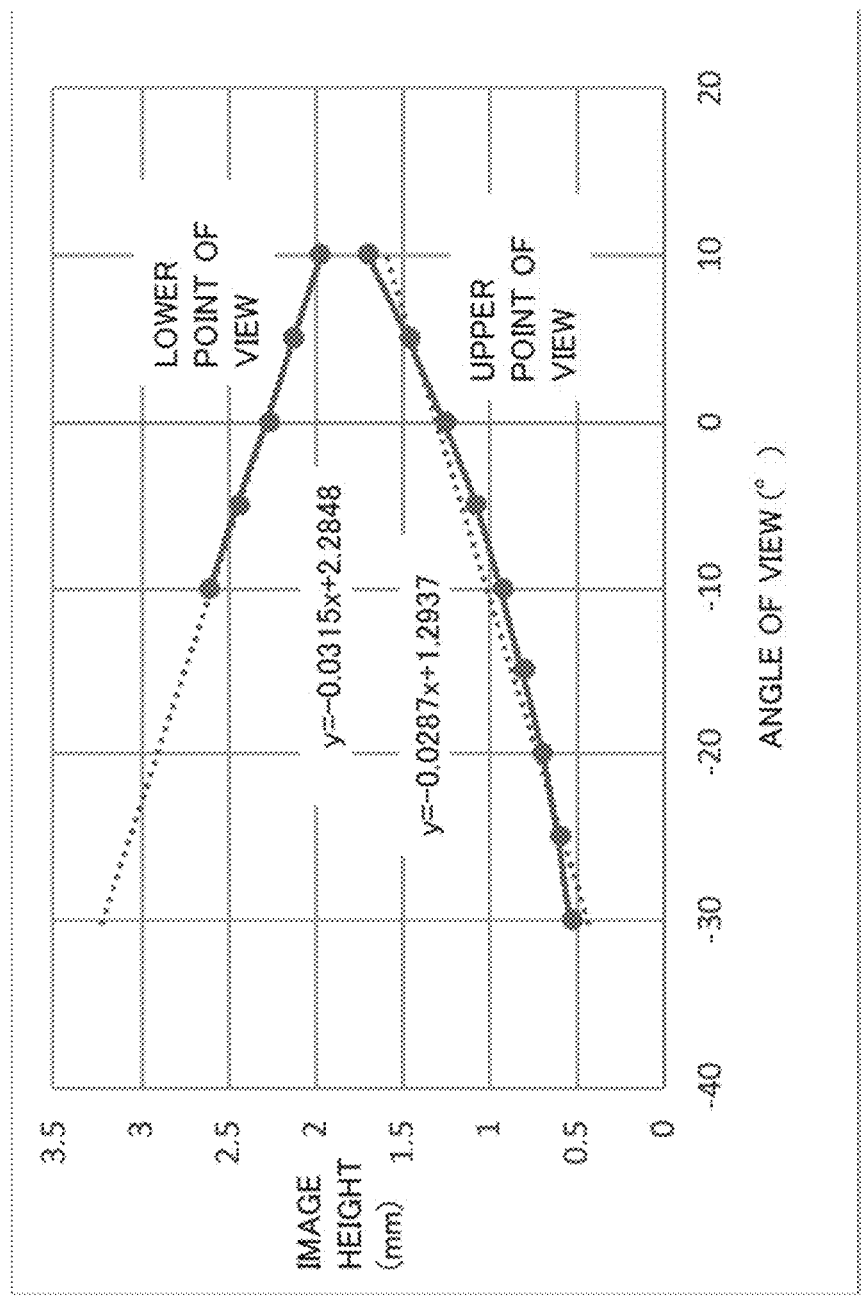
FIG. 4 is a view illustrating a relationship between an angle of view and an image height of an imaging optical system.

Next, FIG. 4 illustrates a relationship between an angle of view of the imaging optical system 104 and an image height. Note that a set of three wide angle lenses having a focal distance of 4 mm and an F value of 2.9 is used for the imaging optical system 104. According to FIG. 4, it can be clear that inclinations of the image height to the angle of view are substantially equal to each other for a case of the upper point of view 1021 and for a case of the lower point of view 1071.

A hyperboloid of each of the upper hyperboloidal mirror 102, the outer circumferential hyperboloidal mirror 107, and the inner circumferential hyperboloidal mirror 108 is not limited to only a case where the conic constant κ is smaller than −1 in the equation (1) in practical terms. The reason is specifically that, in calibration processing by the stereo camera 101, projective transformation is generally performed with an imaging position in a way in which the disparity matching processing is facilitated, and it is possible to handle by the projective transformation when a certain amount of light beams having a certain angle of view is received. Therefore, even when light incident on a certain point of view (for example, the upper point of view 1021) is not necessarily condensed to another focus (for example, the lower point of view 1071) in practical terms, reflected light only needs to be incident on the imaging optical system 104 and reach the image sensor 105 in the end.

Arrangement Example when Stereo Camera 101 is Mounted on Car

Figure 5:
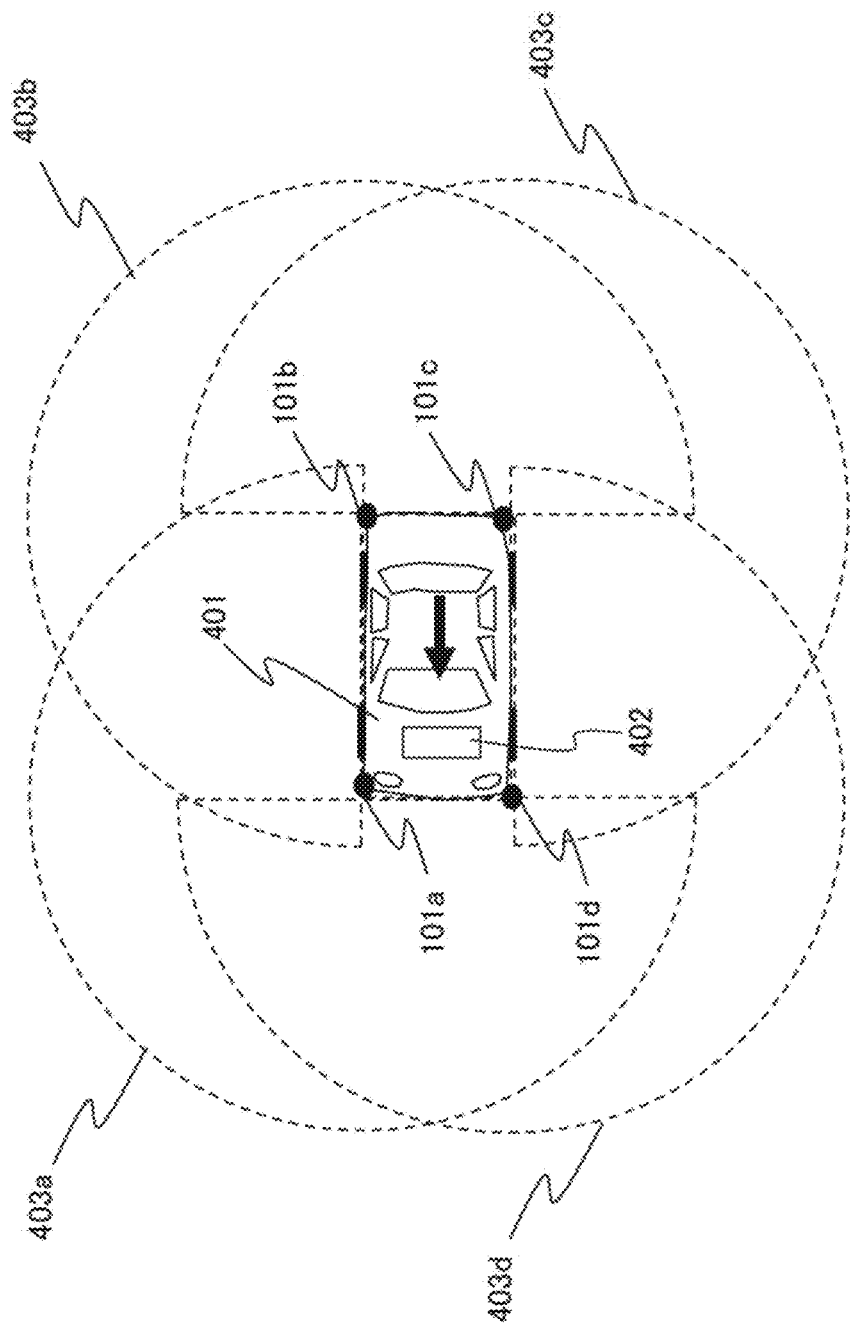
FIG. 5 is a view illustrating an arrangement example when a stereo camera is mounted on a car.

Next, FIG. 5 illustrates an arrangement example when the stereo camera 101 is mounted on a car.

A traveling direction of a car 401 in FIG. 5 is the left in FIG. 5, and a stereo camera 101a having a visual field range 403a of substantially 270° is disposed on a front right corner of the car 401. Note that the remaining 90° of the circumference of 360° is a blind spot due to a car body. Similarly, a stereo camera 101b is disposed on a rear right corner of the car 401, a stereo camera 101c is disposed on a rear left corner of the car 401, and a stereo camera 101d is disposed on a front left corner of the car 401.

However, the arrangement of the stereo cameras 101 in the car 401 is not limited to the four corners. For example, the stereo camera 101 may be disposed on a portion protruding from a car main body such as a door mirror.

Furthermore, the integration control unit 402 is provided in the car 401. The integration control unit 402 integrally controls the stereo cameras 101a to 101d, and also performs image processing similarly to the image processing unit 119.

For a close range (for example, up to approximately 20 m) in the visual field range 403a, the stereo camera 101a serves alone as a stereo camera having a short base line length and performs a three-dimensional distance measurement. For a long range (for example, equal to or more than approximately 20 m) in the visual field range 403a, the stereo camera 101a serves as a stereo camera having a long base line length and performs a distance measurement together with the stereo camera 101b and the stereo camera 101d whose visual field ranges overlap the visual field range 403a. However, an actual distance measurement is performed by the integration control unit 402, based on two output images 117. This similarly applies to the stereo cameras 101b to 101d.

Figure 6:
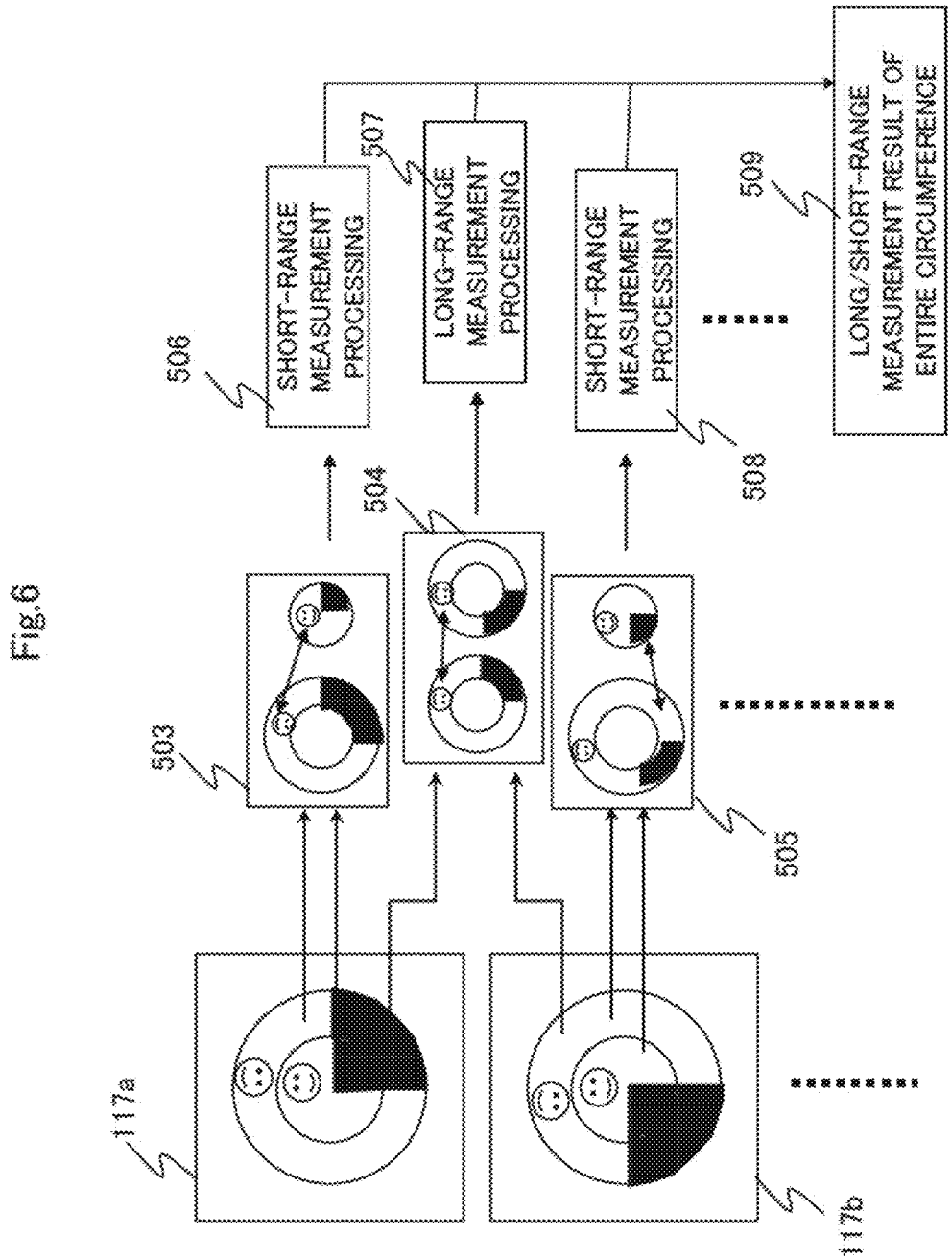
FIG. 6 is a view illustrating an outline of entire circumference distance measurement processing of a car by four stereo cameras.

Next, FIG. 6 illustrates an outline of entire circumference distance measurement processing of the car 401 by the four stereo cameras 101a to 101d mounted on the car. However, in FIG. 6, an output image 117a by the stereo camera 101a and an output image 117b by the stereo camera 101b are illustrated, and output images 117c and 117d by the stereo cameras 101c and 101d are omitted. A black fan-shaped region in the output image 117a and the like represents a blind spot due to a car body of the car 401.

For example, in the stereo camera 101a, the image processing unit 119 (FIG. 1) separates the output image 117a into an inner circumferential region and an outer circumferential region and performs the projective transformation processing, and then performs disparity matching processing 503 and short-range measurement processing 506.

Similarly, for example, in the stereo camera 101b, the image processing unit 119 (FIG. 1) separates the output image 117b into an inner circumferential region and an outer circumferential region and performs the projective transformation processing, and then performs disparity matching processing 505 and short-range measurement processing 508.

Furthermore, the integration control unit 402 (FIG. 5) performs disparity matching processing 504 and long-range measurement processing 507, based on the result of the projective transformation processing of the outer circumferential region separated from the output image 117a and the result of the projective transformation processing of the outer circumferential region separated from the output image 117b.

Note that similar processing is also performed on the output images 117c and 117d (not illustrated), and the integration control unit 402 (FIG. 5) combines the results, and thus a long/short-range ranging result 509 of the entire circumference of the car 401 can be acquired.

For example, the long/short-range ranging result 509 may be displayed on a display, supplied to an electronic control unit (ECU) of a car on which the stereo camera 101 is mounted, output to the integration control unit 402 (FIG. 5), and/or transmitted to a predetermined server.

Figure 7:
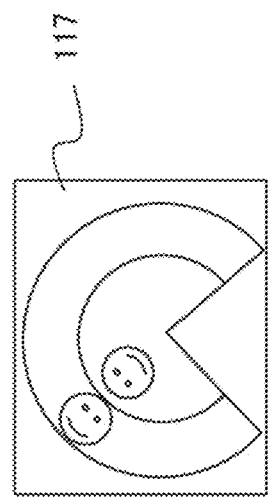
FIG. 7 is a view illustrating an ideal arrangement example of an image in an image sensor.

Note that, when the visual field range 403 of each stereo camera 101 is 270° as illustrated in FIG. 5, and a part of the acquired output image 117 is a blind spot as illustrated in FIG. 6, an arrangement of the images in the image sensor 105 is desirably set such that a blind spot portion is disposed outside the angle of view as illustrated in FIG. 7. In this way, larger images are projected on the image sensor 105, and thus a pixel region of the image sensor 105 can be more efficiently used.

Figure 8:
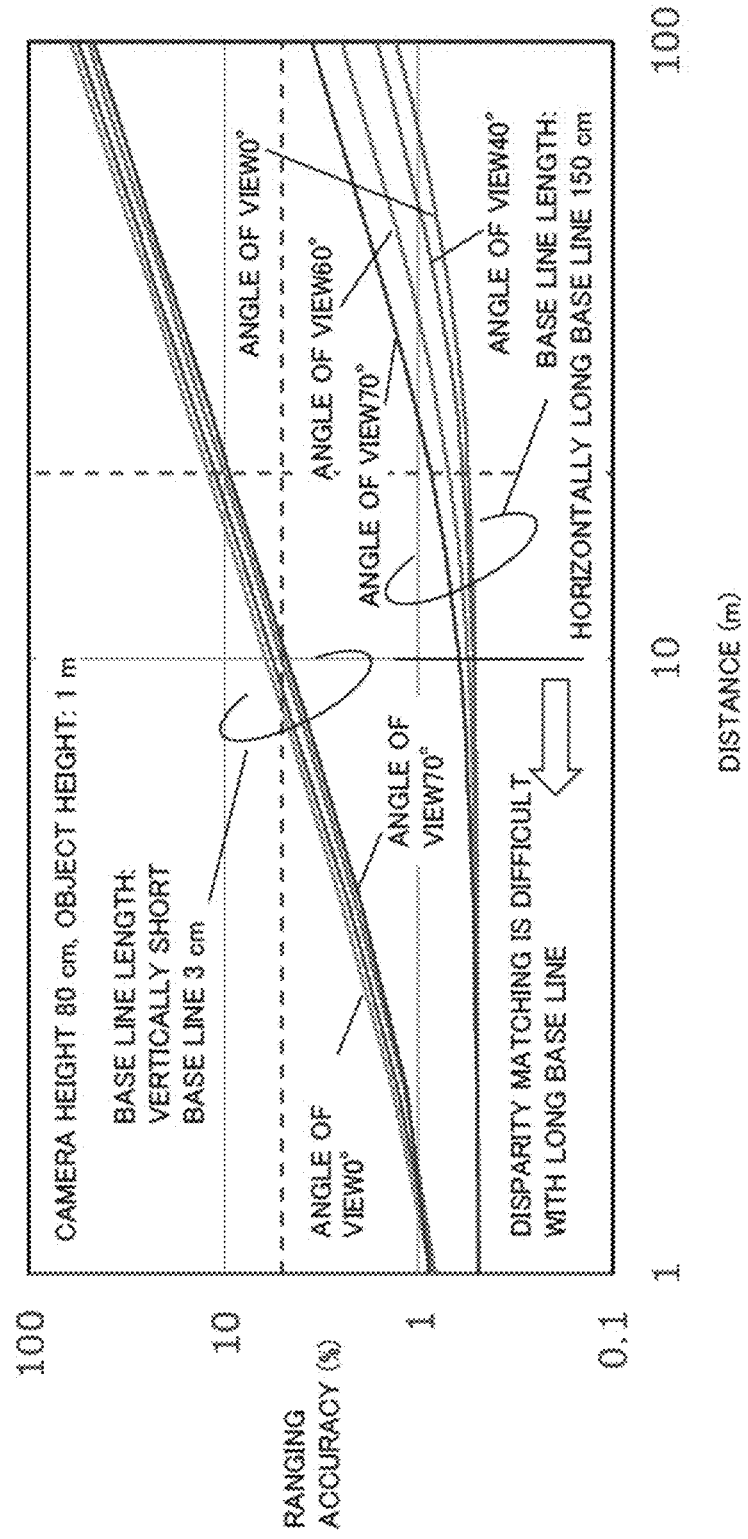
FIG. 8 is a view illustrating a simulation result of ranging accuracy in a stereo camera mounted on a car.

Next, FIG. 8 illustrates a simulation result of ranging accuracy when the stereo camera 101 is mounted on a car.

The simulation of the ranging accuracy calculates ranging accuracy for a case of a base line length being 3 cm in a vertical direction and a case of a base line length being 150 cm in a horizontal direction on the assumption that the stereo camera 101 is located at a height of 80 cm above the ground and an object is located at a height of 1 m. Furthermore, in order to simplify the calculation, a lens of the imaging optical system 104 is assumed to have characteristics in which an image height is proportional to an angle of view of a main light beam. It is assumed that a corresponding point search in the disparity matching processing is completely ideally performed.

The horizontal axis in FIG. 8 is a distance to a subject, the vertical axis is the accuracy of distance to be measured (ranging accuracy), and a distance error of uncertainty of a detection position due to a pixel pitch is indicated in a ratio to an object distance. Further, each of a plurality of lines indicates a difference in angle of view from an optical axis in a left-and-right direction.

According to the simulation result illustrated in FIG. 8, it is clear that a longer base line length basically results in higher ranging accuracy (smaller value in the vertical axis). It is clear that, when a base line length is long in the horizontal direction, the accuracy of distance in an oblique direction decreases. On the other hand, it is clear that, when a base line length is short in the vertical direction, distance accuracy rarely changes with respect to the angle of view.

When an allowable value of the ranging accuracy is 5%, it is clear that the stereo camera 101 alone having a base line length that is short in the vertical direction is suitable for a measurement of a distance of an object present within a range up to a distance of 10 m. Note that, even when two stereo cameras 101 are used for a measurement so that a base line length is long in the horizontal direction, ranging accuracy in terms of calculation increases, but in practical terms, when a base line length is long, a difference (occlusion) in how an object is viewed from each stereo camera 101 increases, and a corresponding point search for the disparity matching processing becomes difficult. Thus, it is appropriate to use a base line length that is short in the vertical direction, in a short range.

Figure 9:
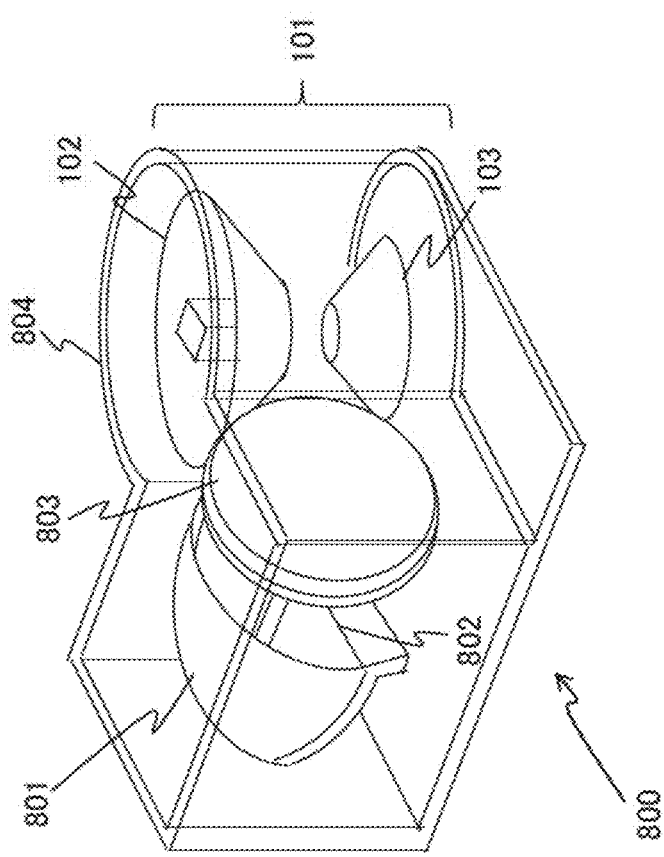
FIG. 9 is a perspective view illustrating a configuration example of an onboard lighting unit that is a second embodiment according to the present invention.

Configuration Example of Onboard Lighting Unit that is Second Embodiment According to the Present Invention Next, FIG. 9 is a perspective view illustrating a configuration example of an onboard lighting unit 800 that is a second embodiment according to the present invention. FIG. 10 is a top view illustrating a configuration example of the onboard lighting unit 800.

The onboard lighting unit 800 is mounted on a car as a premise, and is acquired by integrally incorporating the stereo camera 101 to which the present invention is applied, into a housing 804 of a headlight of the car. Furthermore, a turn lamp, a positioning lamp, and the like may also be incorporated into the onboard lighting unit 800.

Note that the configuration example of the onboard lighting unit 800 illustrated in FIGS. 9 and 10 is assumed to be attached to a front left end of the car, and may be flipped horizontally to be attached to a front right end of the car. Instead of the headlight, a tail lamp, a stop lamp, and the like may be disposed to be attached to each of a rear left end and a rear right end of the car.

The headlight in the onboard lighting unit 800 is mainly formed of an LED light source (not illustrated), a reflector 801 that reflects and condenses white light emitted from the LED light source to the front of the car, a shade 802 that blocks emitted light for forming a cutoff line of a low beam, and a lens 803 that forms an image of an edge blocked by the shade 802 in the distance. Note that, when a high beam is irradiated, for example, the shade 802 may be configured to be movable to shift from an optical path, but description of a detailed structure therefor is omitted. In the housing 804, at least a region from which light of the headlight is emitted and a region where the stereo camera 101 receives light may be formed of a transparent member.

When the stereo camera 101 is integrally formed with the headlight, as illustrated in the top view in FIG. 10, the size of the onboard lighting unit 800 can be reduced by disposing the lens 803 such that the lens 803 is placed in a recessed portion of a side surface between the upper hyperboloidal mirror 102 and the lower hyperboloidal mirror 103.

The onboard lighting unit 800 including the stereo camera 101 and the headlight being integrally formed together can reduce an installation area as compared to a case where the stereo camera 101 is disposed on each of four corners of the car. Furthermore, handling is facilitated, and assembly and positioning with respect to a car body can be easily performed.

The onboard lighting unit 800 in which the stereo camera 101 is incorporated can contribute to, for example, a configuration of an adaptive driving beam (ADB) system for preventing eyes of a driver of an oncoming car and a preceding car from being dazzled. In other words, this can be achieved by selectively controlling a light emission intensity distribution of the LED light source by accurately recognizing a position of an oncoming car and a preceding car by the stereo camera 101. Specifically, for example, in a structure in which an LED light source array includes the LED light source and the shade 802 being disposed in parallel to each other and the reflector 801 can at least form an image of a light emission surface of the LED light source in a direction of a ridge line of the shade 802, a light intensity distribution in the distance can be controlled by turning on and off some LEDs in the LED light source array.

Each embodiment and modification example according to the present invention are described above, but the present invention is not limited to one example of the above-described embodiments, and includes various modification examples. For example, one example of the above-described embodiments is described in detail for the sake of better understanding of the present invention, and the present invention is not necessarily limited to including all the configurations described herein. It is possible to replace a part of a configuration of one example of a certain embodiment with a configuration of another example. It is also possible to add, to a configuration of one example of a certain embodiment, a configuration of another example. For a part of a configuration of one example of each of the embodiments, it is also possible to add, eliminate, and replace another configuration. A part or an entirety of each configuration, function, processing unit, processing means, and the like described above may be implemented with hardware by, for example, designing of an integrated circuit. Illustrations of control lines and information lines in the drawings are those considered to be necessary for the sake of description, and do not include all the control lines and information lines. It may be considered that substantially all the configurations are connected to one another.

The configuration of the stereo camera 101 described above can be classified into further more constituent elements according to a processing content. The configuration of the stereo camera 101 described above can also be classified such that one constituent element performs further more processing.

REFERENCE SIGNS LIST

101: Stereo camera, 102: Upper hyperboloidal mirror, 103: Lower hyperboloidal mirror, 104: Imaging optical system, 105: Image sensor, 106: Opening, 107: Outer circumferential hyperboloidal mirror, 108: Inner circumferential hyperboloidal mirror, 109: Subject, 116: Image, 117: Output image, 118: Driving control unit, 119: Image processing unit, 120: Three-dimensional positional information, 401: Car, 402: Integration control unit, 403: Visual field range, 800: Onboard lighting unit, 801: Reflector, 802: Shade, 803: Lens, 804: Housing.

What is claimed is:

1. A stereo camera comprising:
a first convex hyperboloidal mirror and a second convex hyperboloidal mirror configured to share a central axis and are vertically disposed with vertexes facing each other;
an imaging optical system disposed in an opening provided in a vertex portion of the first convex hyperboloidal mirror; and
an image sensor configured to generate an output image in which two images are simultaneously presented, the two images corresponding to two cases in which a subject is captured from two different points of view, based on light acquired from light of the subject reflected by the first convex hyperboloidal mirror, thereafter further reflected by the second convex hyperboloidal mirror, and then entering the image sensor via the imaging optical system, and light acquired from light of the subject reflected by the second convex hyperboloidal mirror and entering the image sensor via the imaging optical system, wherein
the second convex hyperboloidal mirror is formed of an outer circumferential hyperboloidal mirror and an inner circumferential hyperboloidal mirror that share the central axis with different conic constants, and
an absolute value of the conic constant of the inner circumferential hyperboloidal mirror is greater than an absolute value of the conic constant of the outer circumferential hyperboloidal mirror.

2. The stereo camera according to claim 1, wherein
a second focus of the first convex hyperboloidal mirror located outside the first convex hyperboloidal mirror and a first focus of the inner circumferential hyperboloidal mirror located inside the inner circumferential hyperboloidal mirror substantially coincide with each other, and a second focus of the inner circumferential hyperboloidal mirror located outside the inner circumferential hyperboloidal mirror and a second focus of the outer circumferential hyperboloidal mirror located outside the outer circumferential hyperboloidal mirror substantially coincide with each other.

3. The stereo camera according to claim 2, wherein
a first focus of the first convex hyperboloidal mirror inside the first convex hyperboloidal mirror and a first focus of the outer circumferential hyperboloidal mirror inside the outer circumferential hyperboloidal mirror correspond to the two different points of view.

4. The stereo camera according to claim 1, wherein
the first convex hyperboloidal mirror has an aperture larger than an aperture of the second convex hyperboloidal mirror.

5. The stereo camera according to claim 1, wherein
the first convex hyperboloidal mirror is disposed above the second convex hyperboloidal mirror.

6. The stereo camera according to claim 1, further comprising
an image processing unit configured to compute a distance to the subject, based on the output image.

7. A stereo camera comprising:
a first convex hyperboloidal mirror and a second convex hyperboloidal mirror configured to share a central axis and are vertically disposed with vertexes facing each other;
an imaging optical system disposed in an opening provided in a vertex portion of the first convex hyperboloidal mirror; and
an image sensor configured to generate an output image in which two images are simultaneously presented, the two images corresponding to two cases in which a subject is captured from two different points of view, based on light acquired from light of the subject reflected by the first convex hyperboloidal mirror, thereafter further reflected by the second convex hyperboloidal mirror, and then entering the image sensor via the imaging optical system, and light acquired from light of the subject reflected by the second convex hyperboloidal mirror and entering the image sensor via the imaging optical system, wherein
the first convex hyperboloidal mirror has an aperture larger than an aperture of the second convex hyperboloidal mirror.

8. A stereo camera comprising:
a first convex hyperboloidal mirror and a second convex hyperboloidal mirror configured to share a central axis and are vertically disposed with vertexes facing each other;
an imaging optical system disposed in an opening provided in a vertex portion of the first convex hyperboloidal mirror; and
an image sensor configured to generate an output image in which two images are simultaneously presented, the two images corresponding to two cases in which a subject is captured from two different points of view, based on light acquired from light of the subject reflected by the first convex hyperboloidal mirror, thereafter further reflected by the second convex hyperboloidal mirror, and then entering the image sensor via the imaging optical system, and light acquired from light of the subject reflected by the second convex hyperboloidal mirror and entering the image sensor via the imaging optical system, wherein
the first convex hyperboloidal mirror is disposed above the second convex hyperboloidal mirror.

9. An onboard lighting unit comprising:
a stereo camera and at least one of a headlight, a tail lamp, and a stop lamp that are integrally formed,
the stereo camera including
a first convex hyperboloidal mirror and a second convex hyperboloidal mirror configured to share a central axis and are vertically disposed with vertexes facing each other;
an imaging optical system disposed in an opening provided in a vertex portion of the first convex hyperboloidal mirror; and
an image sensor configured to generate an output image in which two images are simultaneously presented, the two images corresponding to two cases in which a subject is captured from two different points of view, based on light acquired from light of the subject reflected by the first convex hyperboloidal mirror, thereafter further reflected by the second convex hyperboloidal mirror, and then entering the image sensor via the imaging optical system, and light acquired from light of the subject reflected by the second convex hyperboloidal mirror and entering the image sensor via the imaging optical system, wherein the second convex hyperboloidal mirror is formed of an outer circumferential hyperboloidal mirror and an inner circumferential hyperboloidal mirror that share the central axis with different conic constants, and an absolute value of the conic constant of the inner circumferential hyperboloidal mirror is greater than an absolute value of the conic constant of the outer circumferential hyperboloidal mirror.

10. An onboard lighting unit comprising:

a stereo camera and at least one of a headlight, a tail lamp, and a stop lamp that are integrally formed, the stereo camera including
- a first convex hyperboloidal mirror and a second convex hyperboloidal mirror configured to share a central axis and are vertically disposed with vertexes facing each other;
- an imaging optical system disposed in an opening provided in a vertex portion of the first convex hyperboloidal mirror; and
- an image sensor configured to generate an output image in which two images are simultaneously presented, the two images corresponding to two cases in which a subject is captured from two different points of view, based on light acquired from light of the subject reflected by the first convex hyperboloidal mirror, thereafter further reflected by the second convex hyperboloidal mirror, and then entering the image sensor via the imaging optical system, and light acquired from light of the subject reflected by the second convex hyperboloidal mirror and entering the image sensor via the imaging optical system, wherein
- the first convex hyperboloidal mirror has an aperture larger than an aperture of the second convex hyperboloidal mirror.

11. An onboard lighting unit comprising:

a stereo camera and at least one of a headlight, a tail lamp, and a stop lamp that are integrally formed, the stereo camera including
- a first convex hyperboloidal mirror and a second convex hyperboloidal mirror configured to share a central axis and are vertically disposed with vertexes facing each other;
- an imaging optical system disposed in an opening provided in a vertex portion of the first convex hyperboloidal mirror; and
- an image sensor configured to generate an output image in which two images are simultaneously presented, the two images corresponding to two cases in which a subject is captured from two different points of view, based on light acquired from light of the subject reflected by the first convex hyperboloidal mirror, thereafter further reflected by the second convex hyperboloidal mirror, and then entering the image sensor via the imaging optical system, and light acquired from light of the subject reflected by the second convex hyperboloidal mirror and entering the image sensor via the imaging optical system, wherein
- the first convex hyperboloidal mirror is disposed above the second convex hyperboloidal mirror.

12. A stereo camera system comprising:

a plurality of stereo cameras each including
- a first convex hyperboloidal mirror and a second convex hyperboloidal mirror configured to share a central axis and are vertically disposed with vertexes facing each other;
- an imaging optical system disposed in an opening provided in a vertex portion of the first convex hyperboloidal mirror; and
- an image sensor configured to generate an output image in which two images are simultaneously presented, the two images corresponding to two cases in which a subject is captured from two different points of view, based on light acquired from light of the subject reflected by the first convex hyperboloidal mirror, thereafter further reflected by the second convex hyperboloidal mirror, and then entering the image sensor via the imaging optical system, and light acquired from light of the subject reflected by the second convex hyperboloidal mirror and entering the image sensor via the imaging optical system; and an integration control unit configured to compute a distance to the subject, based on a plurality of the output images generated by the plurality of stereo cameras.

* * * * *